United States Patent
Tanjo et al.

[19]

[11] Patent Number: 6,019,361
[45] Date of Patent: Feb. 1, 2000

[54] AUTOMATIC DOCUMENT FEEDER

[75] Inventors: Toru Tanjo; Hiroshi Kobayashi; Hiroyuki Harada; Masahiro Sako; Kazuhisa Kondo; Jun Kusakabe, all of Osaka, Japan

[73] Assignee: Mita Industrial Co., Ltd., Osaka, Japan

[21] Appl. No.: 09/003,931

[22] Filed: Jan. 8, 1998

[30] Foreign Application Priority Data

Jan. 17, 1997 [JP] Japan .................................. 9-007013

[51] Int. Cl.[7] ........................................................ B65H 5/22
[52] U.S. Cl. ........................ 271/3.19; 271/3.2; 271/242; 271/266; 271/186
[58] Field of Search ................................ 271/3.14, 3.19, 271/3.2, 242, 266, 188, 184, 186, 307

[56] References Cited

U.S. PATENT DOCUMENTS

| | | | |
|---|---|---|---|
| 4,699,365 | 10/1987 | Smith et al. | 271/3.1 X |
| 4,787,616 | 11/1988 | Sasaki et al. | 271/3.1 X |
| 4,842,263 | 6/1989 | Robertson | 271/186 |
| 4,916,493 | 4/1990 | DeVito | 355/231 X |
| 5,215,298 | 6/1993 | Stemmie et al. | 271/75 X |
| 5,404,805 | 4/1995 | Fijomoto | 101/118 X |

FOREIGN PATENT DOCUMENTS 2168688  6/1986  United Kingdom .................. 271/186

*Primary Examiner*—William E. Terrell
*Assistant Examiner*—Kenneth Bower
*Attorney, Agent, or Firm*—Smith, Gambrell & Russell, LLP

[57] ABSTRACT

An automatic document feeder conveys an original along a conveying path to an original reading section in an image processor. First and second registration rollers for abutting the conveyed original against their contact portions, and a guide plate for guiding the conveyance of the original to the registration rollers are arranged in the conveying path. The first registration roller includes a plurality of reversing rollers made of rubber for reversing the original along a reversing path, and the reversing rollers are arranged a predetermined distance away from each other along an axis of their supporting shaft. A side edge in the direction of conveyance of the guide plate is in such a comb shape that projections and non-projections are alternatively formed. Each of the projections is opposite to a region between the adjacent reversing rollers, and extends toward the downstream side of the contact portions in the direction of conveyance. Each of the non-projections is opposite to each of the reversing rollers, and is positioned on the upstream side of the contact portions in the direction of conveyance and is in close proximity to the contact portions.

10 Claims, 5 Drawing Sheets

AUTOMATIC DOCUMENT FEEDER

CROSS REFERENCE TO RELATED APPLICATION

This application claims priority benefits under 35 USC §119 of Japanese Patent Application Serial No. 9-7013 filed on Jan. 17, 1997, the disclosure of which is incorporated by reference.

BACKGROUND OF THE INVENTION

1. Field of the Invention

The present invention relates to an automatic document feeder mounted on an image processor such as a copying machine, a facsimile, or an image reader and so adapted as to feed an original from which an image is to be read by the image processor to a reading section of the image processor and return the original from which the image has been read to a tray and an original platen.

2. Description of Related Art

An automatic document feeder mounted on a copying machine, for example, and so adapted as to automatically feed an original set on an original platen to a transparent platen of the copying machine and then return the original to a tray and the original platen has been conventionally known.

In this type of the automatic document feeder, the originals set on the original platen are fed to a conveying path by feeding means such as a feeding belt. The originals (a bundle of originals) fed are separated one at a time by separating means arranged in the conveying path, and only the lowermost original is further fed to the conveying path on the downstream side of the separating means.

The original thus fed is stopped for a predetermined time period in a state where its leading end abutted against a nip portion of a pair of registration rollers, thereby preventing so-called diagonal original feeding.

Thereafter, the rotation of the registration rollers is started at the same timing as operations in the main body of the copying machine. Consequently, the conveyance of the original is resumed, so that the original is led onto the transparent platen. Therefore, an image formed on one surface of the original is read.

On the other hand, in a copying machine capable of making duplex copies of an original, an image formed on one surface of the original is read on a transparent platen. Thereafter, the original is conveyed by a reversing roller along a reversing path for bypassing a part of a conveying path in the opposite direction, and is arranged on the transparent platen again, so that an image formed on the other surface of the original is read.

In order to miniaturize a conveying mechanism, it is considered that one of the pair of registration rollers arranged with the conveying path interposed therebetween is also used for the reversing roller.

In such a case, however, the following new problem arises. Specifically, in a case where the pair of registration rollers performs the function of only a registration, both the registration rollers are composed of polyacetal resin (POM) which easily slides. On the other hand, when one of the registration rollers is also used for the reversing roller, the one registration roller is made of rubber, and the other registration roller is made of POM. Therefore, the leading end of the original does not easily enter a contact portion (also referred to as a nip portion) of the registration rollers, so that the original may be jammed and damaged.

SUMMARY OF THE INVENTION

An object of the present invention is to provide an automatic document feeder capable of reliably engaging the leading end of an original with a contact portion of registration rollers while miniaturizing a conveying mechanism.

In order to attain the above-mentioned object, in a preferred mode of the present invention, an automatic document feeder comprises first and second registration rollers for abutting the leading end of an original conveyed along a conveying path against their contact portion, a guide plate for guiding the conveyance of the original to the first and second registration rollers along the conveying path, and a plurality of reversing rollers included in the first registration roller for reversing the original along a reversing path for bypassing a part of the conveying path. The reversing rollers are arranged a predetermined distance away from each other along an axis of their supporting shaft. A side edge in the direction of conveyance of the guide plate is in such a comb shape that projections and non-projections are alternately formed. Each of the projections is opposite to a region between the adjacent reversing rollers, and each of the non-projections is opposite to each of the reversing rollers.

In this mode, a conveying mechanism can be miniaturized by using the first registration roller also for the reversing roller. Moreover, in the region between the adjacent reversing rollers, the projection in the guide plate extends toward the downstream side of the nip portion in the conveying path, whereby the leading end of the original can be reliably engaged with the nip portion. Consequently, it is possible to prevent the original from being jammed and damaged just ahead of the registration rollers.

It is preferable that each of the projections extends toward the downstream side of the contact portion in the direction of conveyance in the conveying path. It is preferable that each of the non-projections is positioned on the upstream side of the contact portion in the direction of conveyance and is in close proximity to the contact portion.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

One embodiment of the present invention will be described in detail by taking a circulation type document feeder for a copying machine as an example. However, an automatic document feeder according to the present invention is not limited to the circulation type document feeder for a copying machine, and is also applicable to a circulation type document feeder for a facsimile and a circulation type document feeder for an image reader connected to a computer or the like.

Figure 1:
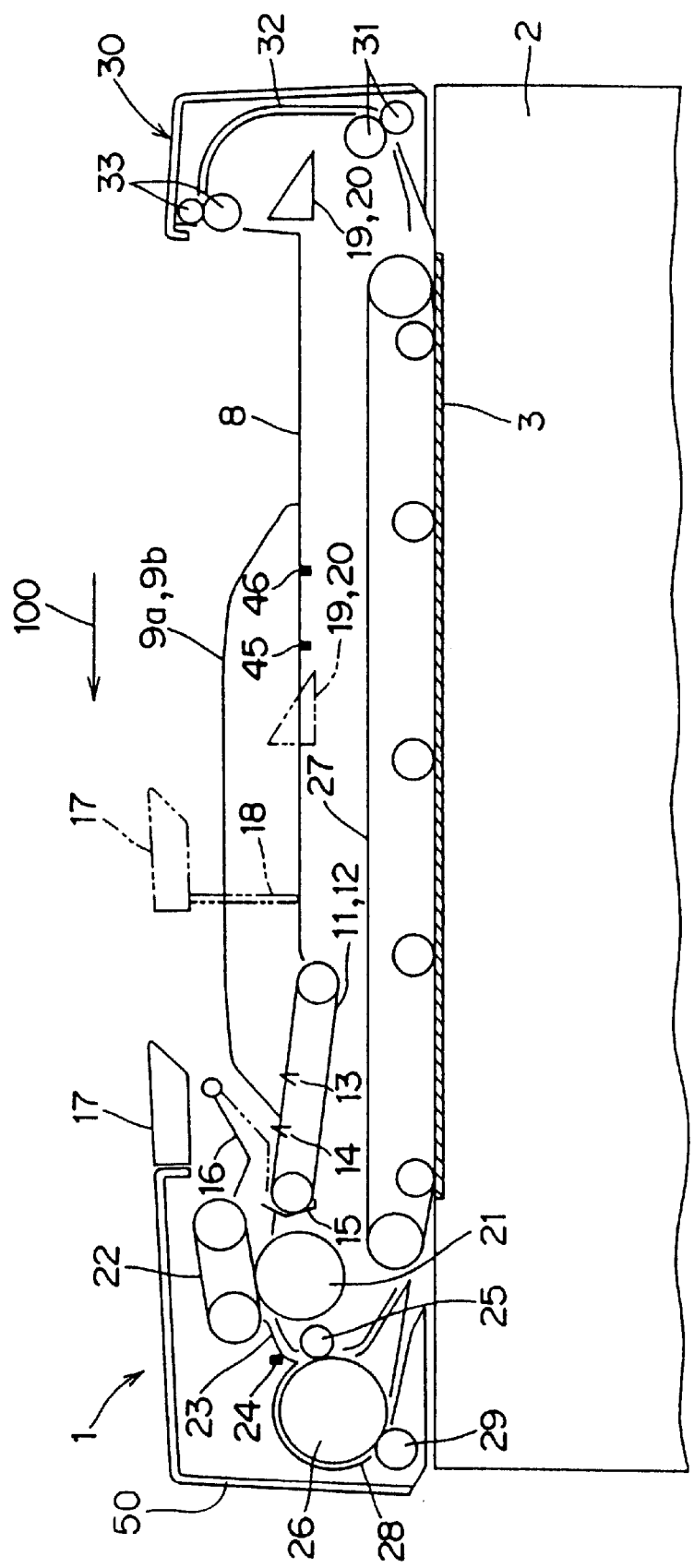
FIG. 1 is a cross-sectional view as viewed from the front, which illustrates the internal construction of a circulation type document feeder according to one embodiment of the present invention in simplified fashion.
Figure 2:
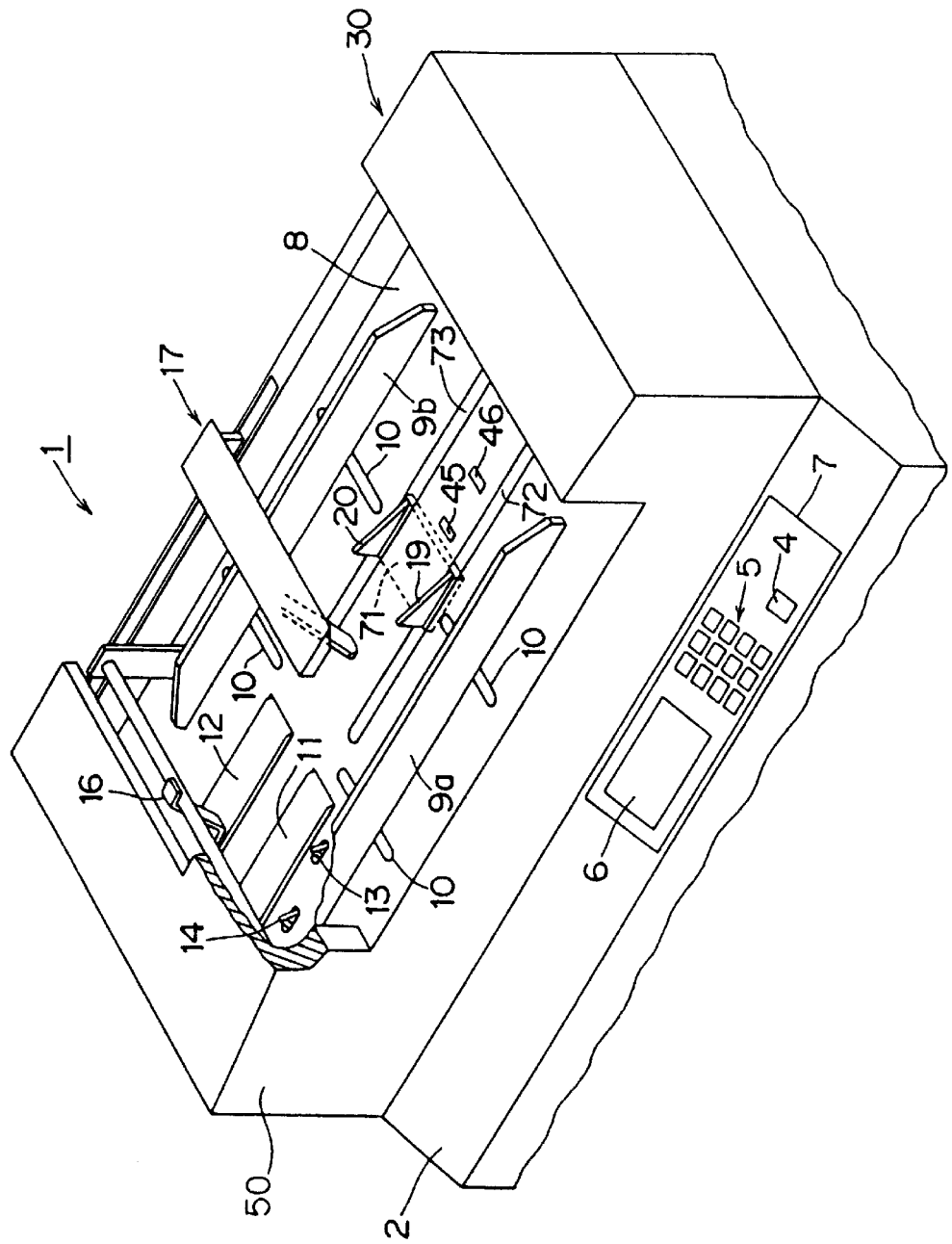
FIG. 2 is a partially cutaway view in perspective showing the circulation type document feeder shown in FIG. 1.

Referring to FIG. 1 while suitably referring to FIG. 2, a circulation type document feeder 1 is mounted on the upper surface of the main body 2 of a copying machine, to automatically feed an original onto a transparent platen 3 arranged on the upper surface of the main body 2 of the copying machine and return the original from which an image has been read to its original position, so that the original can be fed again onto the transparent platen 3. The main body 50 of the circulation type document feeder 1 is also used for a cover of the transparent platen 3, and is opened upward with its inner part centered such that the original can be arranged on the transparent platen 3 even manually.

An operation panel 7 on which operation keys such as a print key 4 and a ten-key 5, a display section 6, and the like are arranged is provided, as shown in FIG. 2, short of the upper surface of the main body 2 of the copying machine. Operations for the main body 2 of the copying machine and the circulation type document feeder 1, for example, are performed through the operation panel 7.

An original platen 8 on which originals to be fed to the transparent platen 3 are to be put is provided in the center of the upper surface of the main body 50 of the circulation type document feeder 1. Originals of B5 size (the fifth size of series B in Japanese Industrial Standard) to A3 size (the third size of series A in Japanese Industrial Standard), for example, can be put on the original platen 8. Further, a pair of original width regulating guides 9a and 9b for positioning the originals put on the original platen 8 in a direction perpendicular to the direction of original conveyance (along the width of the originals) is provided on the original platen 8. The original width regulating guides 9a and 9b are synchronously moved in a direction nearer to each other or in a direction away from each other along a rail 10, and are manually operated so as to correspond to the width of the originals put on the original platen 8.

Two feeding belts 11 and 12 for leading the originals put on the original platen 8 to a predetermined set position as well as starting the conveyance of the originals set in the set position are further disposed in the original platen 8. Specifically, the two feeding belts 11 and 12 are arranged in parallel in a direction perpendicular to the direction of original conveyance, as shown in FIG. 2.

A preset switch 13 for detecting that the originals are put on the original platen 8 is arranged short of the feeding belt 11. When the originals are put on the original platen 8 by a user, the preset switch 13 is turned on, so that the driving of the feeding belts 11 and 12 is started. The originals put on the original platen 8 are delivered in a direction indicated by an arrow 100 (leftward in FIG. 1) by the driving of the feeding belts 11 and 12.

A set switch 14 is arranged on the downstream side of the preset switch 13 in the direction of original conveyance. The feeding belts 11 and 12 are stopped after an elapse of a predetermined time period since the set switch 14 was turned on by the delivered originals. Consequently, the originals are set in a predetermined set position.

A leading end regulating member 15 for regulating the leading ends of the set originals is provided on the downstream side of the paper feeding belts 11 and 12, so that the originals are prevented from flowing toward the downstream side of the above-mentioned set position in the direction of original conveyance. Further, the leading end regulating member 15 performs the function of preventing the originals from being inserted toward the downstream side of the set position in the direction of original conveyance by a user who is unpracticed in the handling of the document feeder.

When the print key 4 provided in the main body 2 of the copying machine is pressed in a state where the originals have been thus set, a partition unit 17 waiting in a home position above the feeding belts 11 and 12 (a position indicated by a solid line in FIG. 1) is moved in the opposite direction to the direction of original conveyance by a distance corresponding to the size of the set originals (a position indicated by a two-dot and dash line in FIG. 1). The partition unit 17 is provided with a partition bar 18 which can be displaced to a non-operable state where it retracts into the partition unit 17 and an operable state where the leading ends of the originals returned to the original platen 8 are regulated. At the time of original conveyance, the partition bar 18 is lowered to the operable state, so that the leading ends of the originals returned to the original platen 8 from an original discharge section 30 as described later are lined up, and the originals which have not been conveyed yet and the originals which have been already conveyed are separated from each other.

Furthermore, two operating plates 19 and 20 waiting in a home position (a position indicated by a solid line in FIG. 1) inside the original discharge section 30 are moved in the direction of original conveyance by a distance corresponding to the size of the set originals (a position indicated by a two-dot and dash line in FIG. 1). The operating plates 19 and 20 are connected to each other by a connecting plate 71 below the original platen 8, and are integrally moved along guide rails 72 and 73 formed apart from each other in a direction perpendicular to the direction of original conveyance in the original platen 8.

Furthermore, each of the operating plates 19 and 20 is a plate-shaped member in an approximately right angled triangular shape having an upward inclined side in the direction of original conveyance, as viewed in a direction perpendicular to the direction of its movement. Accordingly, the original first returned to the original platen 8 is guided by the inclined sides of the operating plates 19 and 20 and is returned without its leading end striking the trailing ends of the originals, which have not been conveyed yet, set in the set position.

On the other hand, a pressing member 16 provided above the feeding belt 12 is displaced to its lowered position indicated by a two-dot and dash line from its raised position indicated by a solid line in FIG. 1, so that the leading ends of the originals set in the set position are pressed against the feeding belt 12. When the leading end regulating member 15 is lowered downward so that the driving of the feeding belts 11 and 12 is resumed, the conveyance of the originals is started.

A separating roller 21 is arranged on the downstream side of the leading end regulating member 15 in the direction of original conveyance. A separating belt 22 is provided opposite to the separating roller 21. The originals (a bundle of originals) fed by the feeding belts 11 and 12 are separated from each other by the separating roller 21 and the separating belt 22, so that only the lowermost original is fed to an original conveying path 23.

When a predetermined time period has elapsed since the original fed to the original conveying path 23 reached a registration switch 24 provided on the original conveying path 23 and the registration switch 24 was turned on, the driving of the feeding belts 11 and 12, the separating roller 21 and the separating belt 22 is stopped. At this time, the leading end of the original is sufficiently abutted against a nip position of a registration roller 25 serving as a second registration roller and a registration/reversing roller 26 serving as a first registration roller, so that the leading end of the original deflects by a predetermined amount. Consequently, such a phenomenon that the original is fed in a state where it is diagonal to the original conveying path 23, that is, so-called diagonal original feeding is prevented.

Thereafter, the rotation of the registration roller 25 and the registration/reversing roller 26 is started at the same timing as operations performed by the main body 2 of the copying machine, whereby the conveyance of the original is resumed. The registration roller 25 and the registration/reversing roller 26 are rotated at relatively low speed for a predetermined time period elapsed since the rotation was started, after which they are rotated at relatively high speed. The predetermined time period during which they are rotated at low speed is set to a sufficiently long time period to absorb the deflection of the original. Accordingly, the deflection of the original is gently eliminated, whereby no functional sound produced when the original is rapidly pulled from a state where it deflects (such sound that the original bursts) is produced.

The original fed by the registration roller 25 and the registration/reversing roller 26 is arranged in a predetermined position on the transparent platen 3 in the main body 2 of the copying machine by a conveying belt 27. When only an image formed on one surface of the arranged original is read, the image is read as it is by the copying machine. On the other hand, when images formed on both surfaces of the arranged original are read, the original is reversed before a image reading operation is performed.

Specifically, the original arranged on the transparent platen 3 is returned to a reversing path 28 by a conveying belt 27. The returned original is conveyed along the conveying belt 27, the registration/reversing roller 26 and a reversing roller 29, and the registration roller 25 and the registration/reversing roller 26, and is arranged again on the transparent platen 3 by the conveying belt 27. The image reading operation is performed by the copying machine, so that the image formed on the reverse surface of the original is read. Thereafter, the original is reversed again, so that the image formed on the surface of the original is read.

The original from which the image has been read is fed to the original discharge section 30 by the conveying belt 27. The original fed to the original discharge section 30 is conveyed along a discharge path 32 by a pair of discharge rollers 31, and is discharged onto the original platen 8 by a pair of discharge rollers 33. That is, the original from which the image has been read is returned to the original platen 8.

Figure 3:
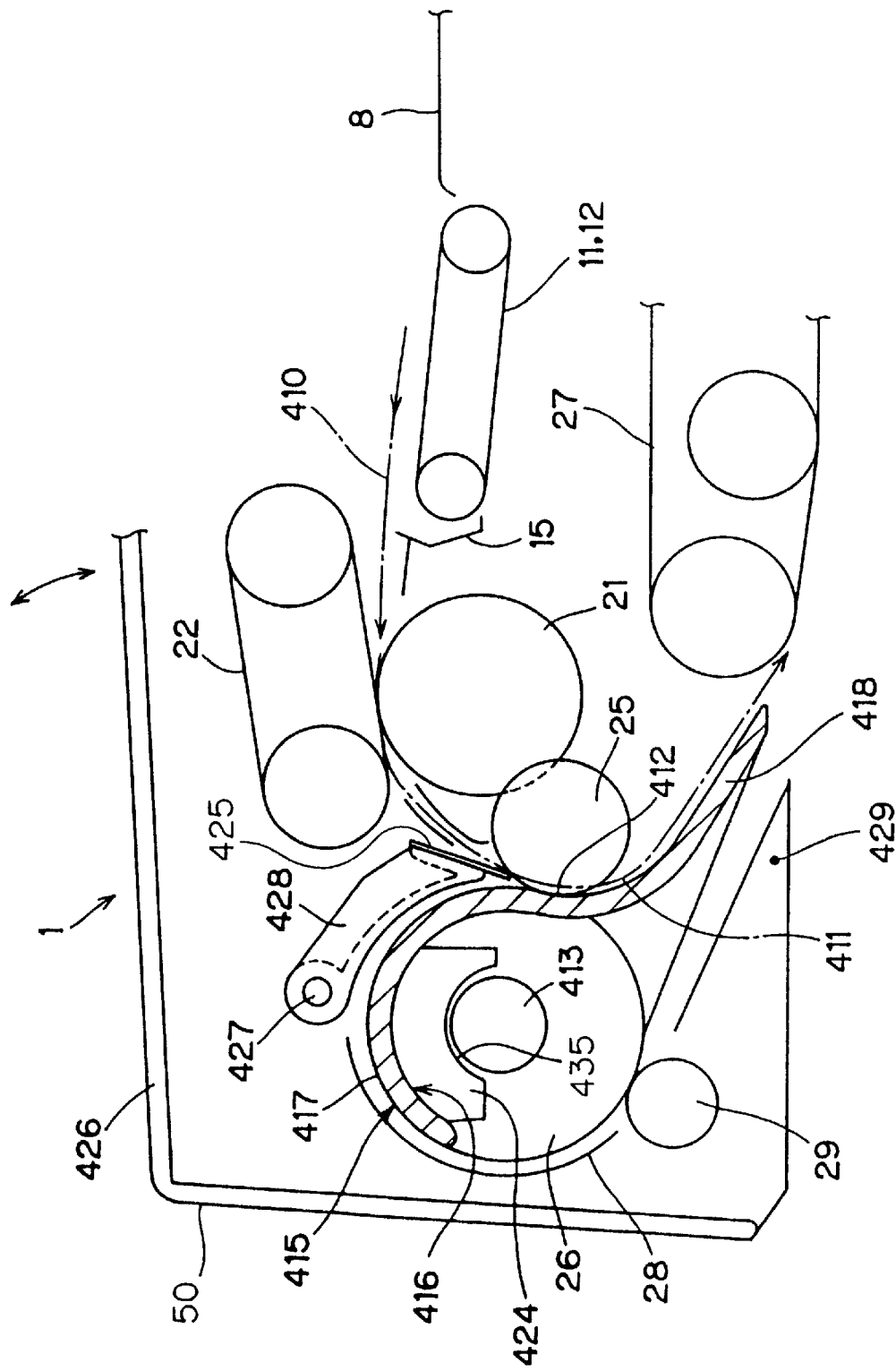
FIG. 3 is a schematic view showing a principal part of the circulation type document feeder shown in FIG. 1 in enlarged fashion.
Figure 4:
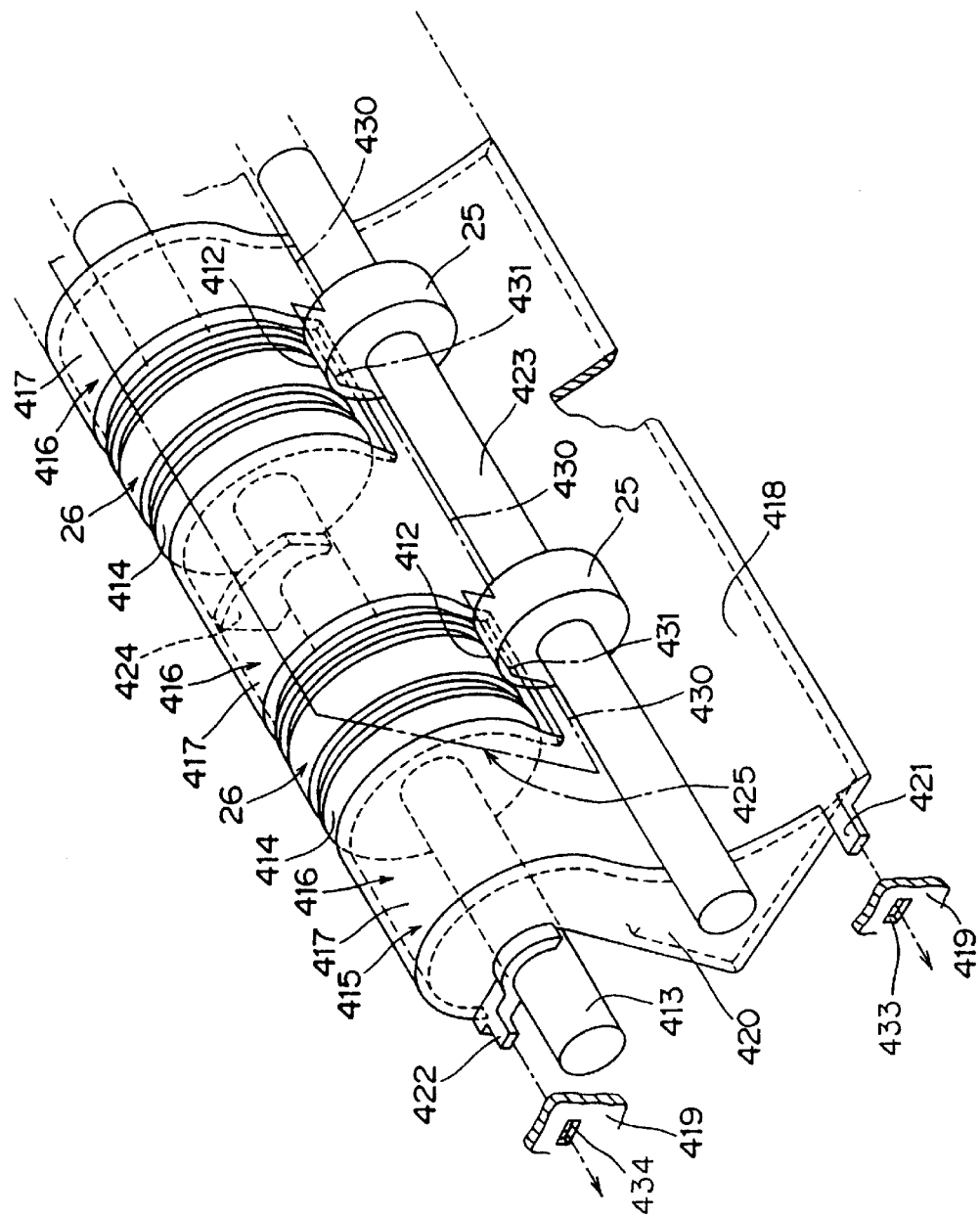
FIG. 4 is a schematic perspective view showing a registration mechanism and a reversing mechanism.

Referring now to FIGS. 3 and 4, description is made of a registration mechanism and a reversing mechanism. Referring to FIG. 3, the registration/reversing roller 26 and the registration roller 25 are arranged in a curved portion 411 of a conveying path 410. The registration/reversing roller 26 is arranged outside the curvature, and the registration roller 25 is arranged inside the curvature. The registration/reversing roller 26 functions as a registration roller for registering the original conveyed along the conveying path 410 and the reversing path 28 in cooperation with the registration roller 25, and functions as a reversing roller for reversing the original conveyed from the transparent platen 3 along the reversing path 28. When the registration roller/reversing roller 26 functions as a reversing roller, the original reversed along the reversing path 28 surrounding the registration/reversing roller 26 is led toward the upstream side of a nip portion 412 which is constituted by the registration/reversing roller 26 and the other registration roller 25, and is merged into an intermediate portion of the conveying path 410. Therefore, the registration/reversing roller 26 functions as a registration roller.

Referring to FIG. 4, a plurality of registration/reversing rollers 26 are arranged apart from each other along an axis of a supporting shaft 413. A plurality of registration rollers 25 are also provided so as to be respectively opposite to the plurality of registration/reversing rollers 26.

The registration/reversing roller 26 is composed of a cylinder made of rubber which is fitted in the peripheral surface of a roller supporting member 414 made of resin fixed to the supporting shaft 413 so as to be integrally rotatable. On the other hand, the registration roller 25 is composed of resin having a low coefficient of friction which easily slides, for example, polyacetal resin.

A reversal guiding member 415 is so arranged as to cover a portion between the adjacent registration/reversing rollers 26. The reversal guiding member 415 comprises a plurality of curved guiding main units 416 arranged between the registration/reversing rollers 26 in order to guide the reversal of the original conveyed along the reversing path 28 and a supporting member 418 for collectively supporting the guiding main units 416. A guide surface 417 composed of an outer peripheral surface of the guiding main unit 416 is curved along the peripheral surface of the registration/reversing roller 26 as viewed along the axis, as shown in FIG. 3.

The reversal guide member 415 comprising the guide surface 417 along the peripheral surface of the registration/reversing roller 26 as viewed along the axis between the adjacent registration/reversing rollers 26 is thus provided, whereby the leading end of the original can be reliably engaged with the nip portion 412. As a result, it is possible to prevent the original from being jammed and damaged just ahead of the registration rollers 25 and 26.

Referring to FIG. 4, the supporting member 418 in the reversal guiding member 415 is composed of a longitudinal member which is long in a direction parallel to the supporting shaft 413 of the registration/reversing rollers 26, and both its ends are supported by a pair of side plates 419 (only one of the side plates is illustrated) supporting both ends of the supporting shaft 413 of the registration/reversing rollers 26. That is, a pair of engaging projections 421 and 422 is formed in an end surface plate 420 constituting both ends of the supporting member 418. The engaging projections 421 and 422 are respectively fitted in a pair of engaging holes 433 and 434 provided in the side plate 419, so that the supporting member 418 is fixed to the side plate 419. The side plates 419 support the supporting shaft 413 of the registration/reversing rollers 26 and the supporting shaft 423 of the registration rollers 25 respectively through bearings (not shown).

Referring to FIG. 4, a deflection preventing portion 424 composed of a rib abutted against an intermediate portion along the axis of the supporting shaft 413 of the registration/reversing rollers 26 for preventing the deflection of the longitudinal reversal guiding member 415 is provided in the guiding main unit 416 in an intermediate portion along the length of the reversal guiding member 415. The deflection preventing portion 424 comprises a circular arc surface 435 opposite to the peripheral surface of the supporting shaft 413, as shown in FIG. 3. It is preferable that a very small clearance is set between the circular arc surface 435 and the peripheral surface of the supporting shaft 413. The reason for this is that when the reversal guiding member 415 does not deflect, it is possible to avoid the contact between the deflection preventing portion 424 and the supporting shaft 413. Consequently, no resistance is given to the rotation of the supporting shaft 413 when it is unnecessary to give resistance. The amount of the clearance may be set to an allowable amount of deflection in a range in which the original conveyance is not affected.

When the longitudinal reversal guiding member 415 is supported only by both its ends, the intermediate portion along the length of the reversal guiding member 415 may deflect. If the intermediate portion deflects, the leading end of the original may be unable to be reliably guided to the nip portion. On the other hand, in the present embodiment, the deflection preventing portion 424 provided in the intermediate portion along the length of the reversal guiding member 415 is abutted against the supporting shaft 413 to prevent the deflection of the reversal guiding member 415, whereby the leading end of the original can be reliably guided to the nip portion. Although in the present embodiment, the deflection preventing portion 424 is formed in one of the guiding main units 416, the deflection preventing portion 424 may be formed in a plurality of or all guiding main units 416.

Referring to FIGS. 3 and 4, the supporting member 418 in the reversal guiding member 415 is also used for a guiding member for guiding the original passing between the registration/reversing roller 26 and the registration roller 25 toward the transparent platen 3. Therefore, the original reversed through the reversing path 28 can be smoothly led onto the transparent platen 3.

Further referring to FIGS. 3 and 4, in the conveying path 410, the guide plate 425 for guiding the conveyance of the original is provided on the upstream side of the nip portion 412 of the registration rollers 25 and 26 in the conveying path 410. The guide plate 425 is composed of a resin sheet or a resin film having elasticity, for example.

The guide plate 425 is rotatably supported around a shaft 427 through a supporting arm 428 by a cover 426 covering one end of the main body 50 of the circulation type document feeder 1 such that it can be opened. The cover 426, together with the separating belt 22 and the guide plate 425, is displaced by being rotated around a predetermined axis 429 at the time of jam processing, for example, to open the conveying path 410 and the reversing path 28.

The guide plate 425 is held in a predetermined posture in which the conveyance of the original is guided by the abutment of the supporting arm 428 against a stopper (not shown) provided in the cover 426 in a state where the cover 426 is closed as shown in FIG. 3. Further, when the cover 426 is opened or closed, the guide plate 425 is opened or closed while avoiding the interference with the registration/reversing rollers 26 by a cam mechanism (not shown) interposed between the cover 426 and the supporting arm 428.

Referring to FIG. 4, a leading edge (a lower edge) of the guide plate 425 is in such a comb shape that projections 430 respectively opposite to portions between the registration/reversing rollers 26 and non-projections 431 respectively opposite to the registration/reversing rollers 26 are alternately formed. The non-projection 431 is positioned just ahead of the nip portion 412, and the projection 430 extend toward the downstream side of the nip portion 412 in the conveying path 410.

Portions of the guide plate 425 which correspond to the portions between the plurality of registration/reversing rollers 26 are formed into the projections 430 so projected as to extend toward the downstream side of the nip portion 412 in the conveying path 410. Therefore, the leading end of the original to be guided can be reliably engaged with the nip portion 412. From this point of view, it is possible to effectively prevent the original from being jammed and damaged in the vicinity of the registration rollers 25 and 26.

Figure 5:
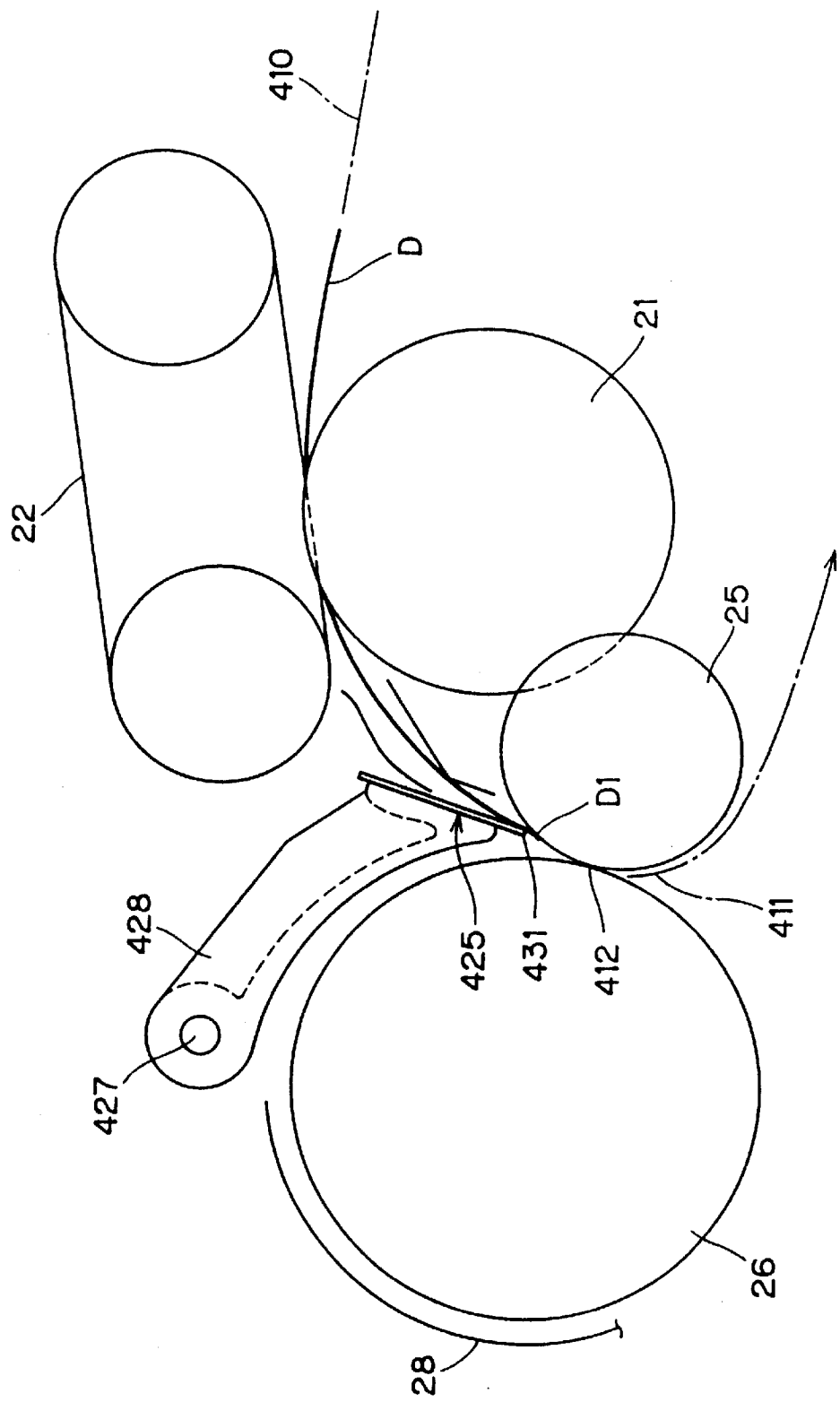
FIG. 5 is a schematic view showing a registration mechanism showing a state where an original is conveyed.

Furthermore, as to the non-projections 431 of the guide plate 425, a leading end D1 of an original D is so directed as to be first abutted against the registration roller 25 made of resin inside the curvature, as shown in FIG. 5. The leading end D1 of the original D is thus first abutted against the registration roller 25 which easily slides, whereby the leading end D1 of the original D can be smoothly urged toward the nip portion 412. Even in a case where in order to miniaturize the circulation type document feeder 1, the height thereof is decreased and therefore, the degree of the curvature of the conveying path 410 is increased, the leading end D1 of the original D can be reliably led to the nip portion 412. From this point of view, it is possible to effectively prevent the original from being jammed and damaged in the vicinity of the registration rollers 25 and 26.

The original reversed along the reversing path 28 by the registration/reversing roller 26 and then passing through the nip portion 412 of the registration rollers 25 and 26 reverses in the direction of the curvature by the reversal. Consequently, the leading end of the original is first abutted against the registration roller 25 inside the curvature by a rebound from the bending, whereby the direction of the guide plate 425 may not exert an adverse effect thereon.

Although in the above-mentioned embodiment, the guide plate 425 is so directed that the leading end of the original is first abutted against the registration roller 25 inside the curvature, it may be directed toward the nip portion 412.

The prevent invention is also applicable to a non-circulation type automatic document feeder. In addition thereto, various modifications can be made in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic document feeder comprising:

first and second registration rollers having contact portions with each other for abutting a leading edge of an original against the contact portion, which original is conveyed along a conveying path, a guide plate for guiding the original to the first and second registration rollers along the conveying path; and a plurality of reversing rollers included in the first registration roller for reversing the original along a reversing path for bypassing a part of the conveying path, the reversing rollers being arranged a predetermined distance away from each other along an axis of a roller supporting shaft, an edge in a direction of conveyance of the guide plate being in such a comb shape that projections and non-projections are alternately formed, the projections being opposite to respective regions between the adjacent reversing rollers, the non-projections being respectively opposite to the reversing rollers.

2. The automatic document feeder according to claim 1, wherein each of the projections extends toward a downstream side of the contact portions in the direction of conveyance in the conveying path.

3. The automatic document feeder according to claim 1, wherein each of the non-projections is positioned on a upstream side of the contact portions in the direction of conveyance and is in close proximity to the contact portions.

4. The automatic document feeder according to claim 1, further comprising a plurality of supporting members provided in the supporting shaft so as to be integrally rotatable, the reversing rollers being respectively composed of cylinders made of rubber fitted in peripheral surfaces of the supporting members.

5. The automatic document feeder according to claim 1, wherein the second registration roller is formed of polyacetal resin.

6. The automatic document feeder according to claim 1, wherein the guide plate is composed of a resin sheet or a resin film.

7. The automatic document feeder according to claim 1, wherein the first and second registration rollers are arranged in a curved portion of the conveying path.

8. The automatic document feeder according to claim 7, wherein the first registration roller is arranged outside a curvature of the curved portion.

9. The automatic document feeder according to claim 1, further comprising a main body of the automatic document feeder, and an openable cover member for covering an end of the main body, the cover member supporting the guide plate such that the guide plate separates from the conveying path when the cover member is opened.

10. The automatic document feeder according to claim 9, wherein the cover member is rotatably supported around a predetermined axis by the main body, and the guide plate is rotatably supported around a predetermined axis by the cover member.

* * * * *